(12) United States Patent
Eastman, II

(10) Patent No.: US 7,028,635 B1
(45) Date of Patent: Apr. 18, 2006

(54) WILD GAME FEEDER WITH COLLAPSIBLE RESERVOIR

(76) Inventor: Robert Eastman, II, P.O. Box 380, Flint, MI (US) 48433

( * ) Notice: Subject to any disclaimer, the term of this patent is extended or adjusted under 35 U.S.C. 154(b) by 0 days.

(21) Appl. No.: 10/447,598

(22) Filed: May 29, 2003

(51) Int. Cl.
*A01K 5/00* (2006.01)
(52) U.S. Cl. ............................... 119/51.11; 119/57.91
(58) Field of Classification Search ............. 119/51.11, 119/57.91, 54, 51.01, 52.4, 52.2, 61
See application file for complete search history.

(56) References Cited

U.S. PATENT DOCUMENTS

| | | | |
|---|---|---|---|
| 1,790,045 A * | 1/1931 | Harvey | 119/52.1 |
| 2,789,534 A * | 4/1957 | Landgraf | 119/52.1 |
| 2,837,860 A | 6/1958 | Norling | |
| 3,034,480 A | 5/1962 | French | |
| 3,195,508 A | 7/1965 | Lehman et al. | |
| 3,949,909 A * | 4/1976 | Sterner | 222/199 |
| 4,036,361 A | 7/1977 | Jacobson et al. | |
| 4,204,500 A * | 5/1980 | Podjan | 119/57.8 |
| 4,290,468 A | 9/1981 | Rosenbloom, Jr. et al. | |
| 4,557,378 A | 12/1985 | Klebold | |
| 4,693,386 A | 9/1987 | Hughes et al. | |
| 4,945,859 A | 8/1990 | Churchwell | |
| 4,986,220 A | 1/1991 | Reneau et al. | |
| 5,105,766 A * | 4/1992 | Montgomery | 119/57.91 |
| 5,143,289 A | 9/1992 | Gresham et al. | |
| 5,190,179 A | 3/1993 | Richter et al. | |
| 5,291,854 A * | 3/1994 | Tzanet et al. | 119/52.2 |
| 5,333,572 A | 8/1994 | Nutt | |
| 5,479,881 A | 1/1996 | Lush et al. | |
| 5,862,777 A | 1/1999 | Sweeney | |
| 6,047,661 A | 4/2000 | Lush | |
| 6,073,582 A | 6/2000 | Lush | |
| 6,082,300 A | 7/2000 | Futch | |
| 6,390,021 B1 * | 5/2002 | Krenzel | 119/52.2 |
| 6,427,629 B1 * | 8/2002 | Lush | 119/52.1 |
| 6,481,376 B1 | 11/2002 | Finklea | |
| 6,510,813 B1 | 1/2003 | Boone, Jr. | |

\* cited by examiner

*Primary Examiner*—Yvonne R. Abbott
(74) *Attorney, Agent, or Firm*—Carrier, Blackman & Associates, P.C.; William D. Blackman; Joseph P. Carrier

(57) ABSTRACT

A wild game feeding apparatus includes a support structure, a food distributor, and a collapsible reservoir. The reservoir is made collapsible in order to minimize the size of the apparatus for ease of storage and transport. Wild game feed, such as corn, wheat, or other particulate food is loaded into the collapsible container, whence it exits out of the bottom of the container and contacts the distributor. The distributor includes a rotating plate for distributing the food in a limited radius from the feeder apparatus. Optionally, the apparatus may include a control mechanism including a timer, to actuate operation thereof at specific time intervals which are pre-set by a user.

4 Claims, 11 Drawing Sheets

FIG - 7
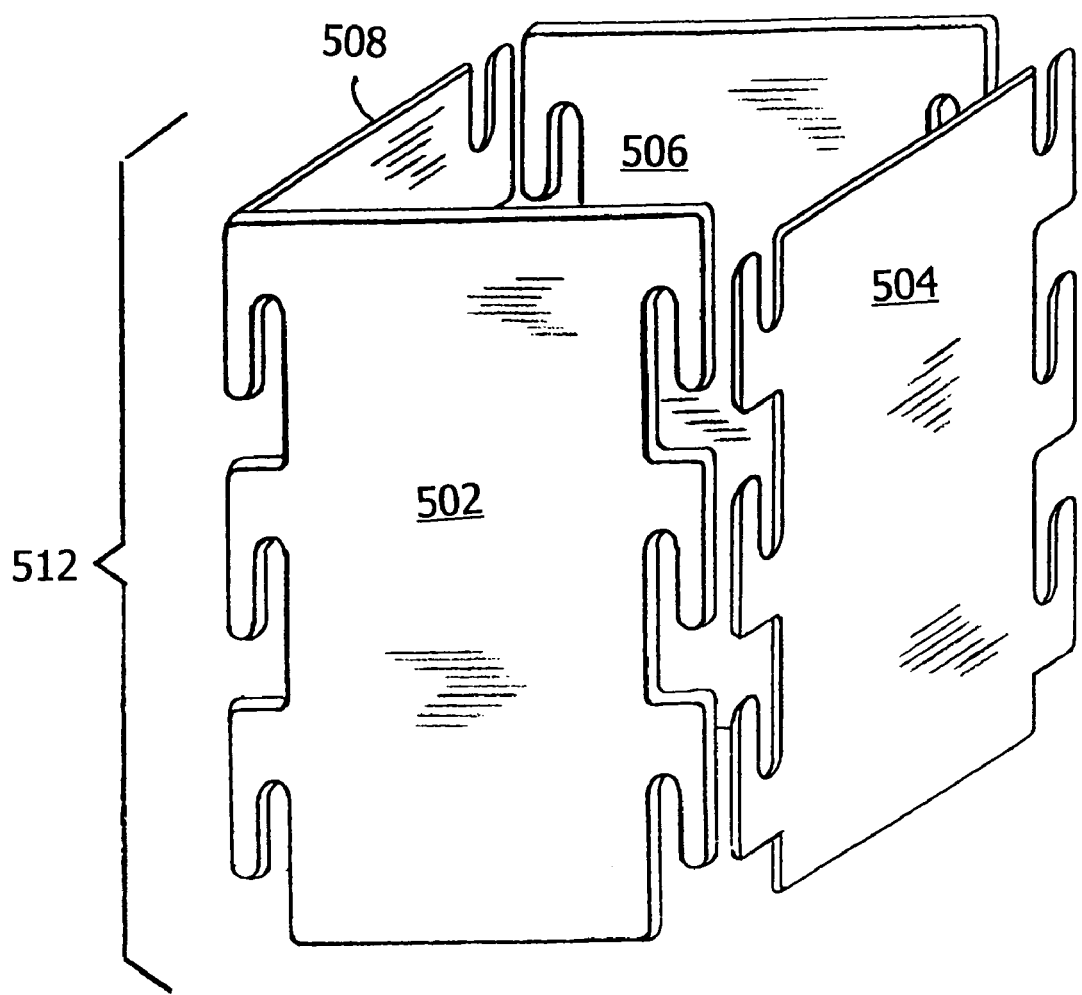
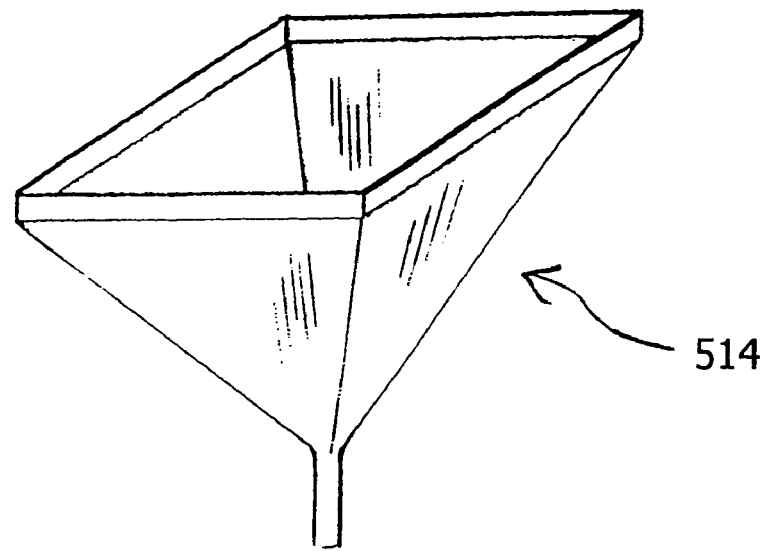

US 7,028,635 B1

WILD GAME FEEDER WITH COLLAPSIBLE RESERVOIR

BACKGROUND OF THE INVENTION

1. Field of the Invention

The present invention relates to wild game feeders, which are used to spread food in order to entice and attract wild game animals, such as deer, to a specified geographical area, in order to create observational and gaming opportunities for hunters and/or wildlife enthusiasts.

2. Description of the Background Art

Wild game feeders, of several varieties and designs, are commercially available today, and are known to wild game hunters. Such known feeders generally include a bucket or similar container for holding particulate food therein, and a distributor for spreading food from the container over an area of ground.

For example, FIG. 1 illustrates one example of a wild game feeder 50, of a prior art type which is known and which is commercially available on the market today. The feeder 50 of FIG. 1 includes a reservoir 52 in the form of a bucket, with a central hole (not shown) formed in the base thereof, to allow aggregate food such as corn, commercial pellets or the like to pass through.

The reservoir 52 is provided with a removable lid 54 and a handle 60. A distributor 56, including an electric motor 57, is attached to the bucket base, to distribute the food after it passes outwardly from the bucket. Supports, such as legs 58, are also attached to the reservoir 52, to space it upwardly away from the ground.

Examples of previously issued patents relating to wild game feeders are given below.

U.S. Pat. No. 4,986,220 discloses a game feeder that uses a distributor to spread food from a container. The distributor includes a spinning member that cuts excessively large food pieces down to smaller pieces, thereby allowing the game feed to be more easily distributed.

U.S. Pat. No. 5,862,777 discloses a feeder that uses a distributor with a rotational plate in order to distribute the game food. The apparatus according to this invention is mounted on a single support leg, which is inserted into the ground to support the apparatus.

Other wild game feeders of this general type are described in U.S. Pat. Nos. 3,034,480, 3,195,508, 4,945,859, 5,143,289, 5,333,572, 6,082,300, 6,481,376, and 6,510,813.

A limited number of collapsible containers are separately known, such as those disclosed in U.S. Pat. Nos. 2,837,860, 4,036,361, 4,290,468, 4,557,378, 4,693,386 and 5,190,179.

Some collapsible bird feeders are also known, such as those described in U.S. Pat. Nos. 5,479,881, 6,047,661 and 6,073,582.

Although the known devices are usable for their intended purposes, it would be advantageous if a wild game feeder apparatus could be made using a collapsible reservoir for the food. This would make the apparatus more convenient to store and ship, and would take up less space on a retail shelf, allowing retailers to store more units in a given area.

SUMMARY OF THE INVENTION

The present invention provides an improved wild game feeder, including a collapsible food reservoir. The apparatus according to the invention may be stored and transported with the reservoir in a smaller, collapsed configuration, but is easily expandable to full size in the field.

The present invention provides an improved, space-saving feeder apparatus, which is easier to store and transport than the previously known feeders.

A collapsible game feeder according the present invention, generally, includes a collapsible reservoir, a support structure used for supporting the collapsible reservoir in relation to a substrate, and a distributor attached to the bottom of the reservoir.

The collapsible reservoir makes the game feeder according to the present invention adapted for more efficient storage and transportation than the prior art game feeders.

The collapsible reservoir may have a form selected from many different options, including compressibly collapsible forms. Examples of compressibly collapsible reservoirs include suspended cloth or wire mesh bag, collapsible segmented annular housing, or flexible fabric or plastic bag with internal springs or stiffeners.

Other forms that the collapsible reservoir can take include foldably collapsible box structures and a composite box, made in separate pieces, which can be easily assembled in the field by a user.

In a first illustrative embodiment of the present apparatus, the collapsible reservoir is made of a plurality of substantially rigid annular plastic sections, the edges of which are adapted to frictionally engage one another in the expanded configuration of the reservoir.

The collapsible reservoir also includes a lid that fits onto the top thereof.

The collapsible reservoir is supported by a support structure. The support structure may include legs for supporting the reservoir on a flat surface such as the ground.

Alternatively, the support structure may include a handle and/or a hook at the top of the reservoir, to allow the feeder to be suspended from a tree branch or other overhead substrate.

The support structure also supports the distributor, which includes a motor and a rotatable spreader plate operatively connected to the motor. The distributor is attached to the collapsible reservoir by a plurality of vertically oriented bolts or studs, extending between the motor housing and the bottom of the reservoir, or attached to a separate frame structure.

The distributor operates in the following manner. With the reservoir in its expanded, operational configuration, particulate food is placed into the reservoir, from whence it passes outwardly through a reduced opening at the base of the reservoir. The food comes to rest on the rotatable spreader plate, and forms a substantially conical pile thereon. When the pile becomes high enough to reach the reservoir outlet, it effectively stops the flow of any more food passing outwardly through the reduced opening. Once the motor is activated, the spreader plate spins, and food is thrown therefrom to an area within a certain radius of the feeder apparatus.

In another embodiment of the collapsible reservoir, a collapsible cylindrical body with flexible support means may be used. In this embodiment, the collapsible reservoir includes a cylindrical body having an upper and lower end, where the body is defined by a fabric sleeve, with stiff hoop segments affixed horizontally throughout the inner diameter of the reservoir, separated and supported by stiffening members affixed horizontally therebetween.

In yet another embodiment of the collapsible reservoir, the collapsible reservoir includes a substantially cylindrical fabric bag, a pair of metal or plastic reinforcement hoops disposed at the top and bottom of the bag, and a spring which is operatively connected to the bag. The spring runs spirally along the inner circumference of the fabric bag.

Additional embodiments of the collapsible reservoir may also be used.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 7 is an exploded perspective view of a reservoir and food metering funnel which are components of a wild game feeder according to a fifth embodiment of the present invention;

DETAILED DESCRIPTION

Figure 1:
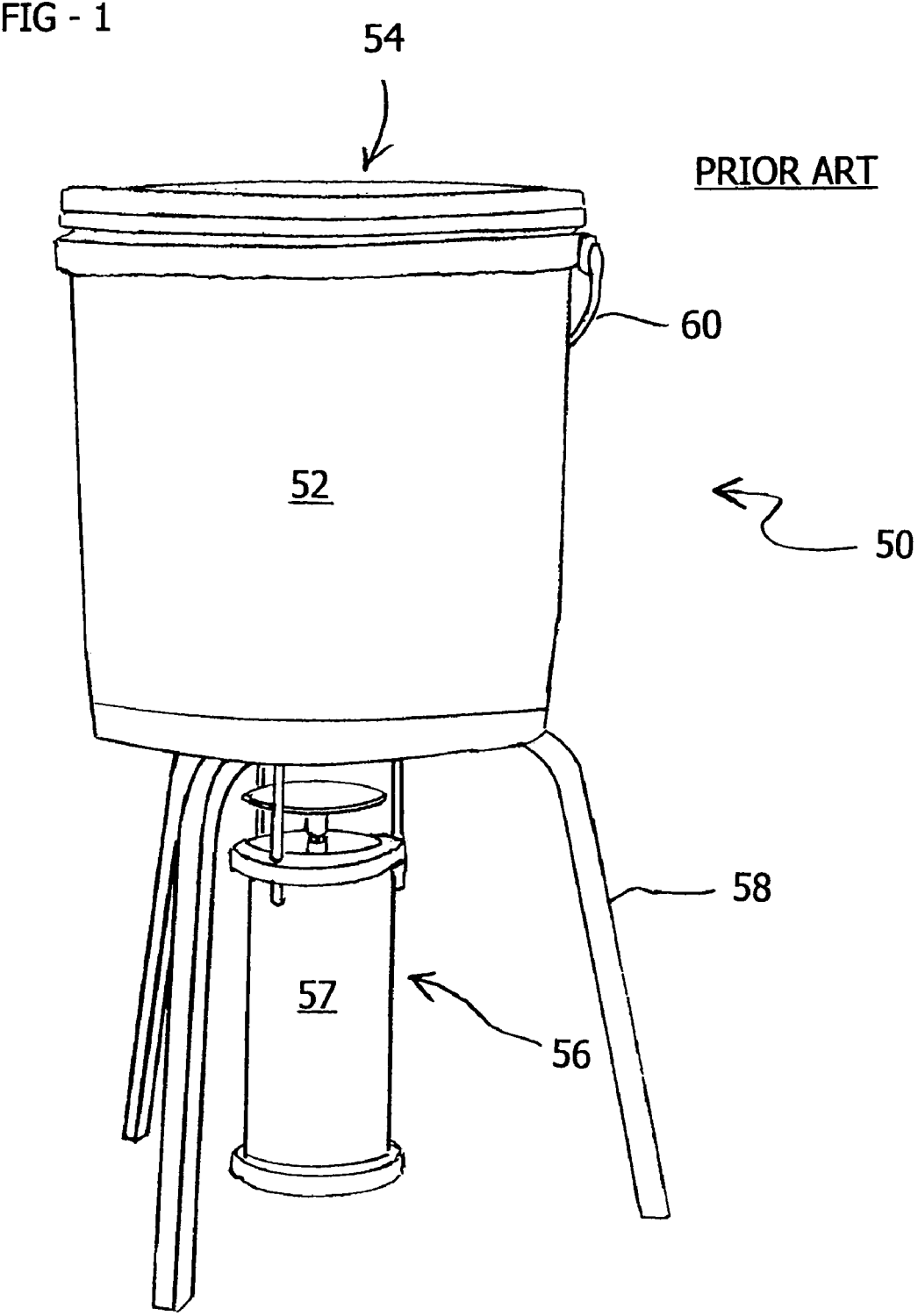
FIG. 1 is a perspective view of a prior art wild game feeder.

Referring now to the drawings, a first embodiment of a game feeder apparatus, according to the present invention, is shown generally at 110. It will be apparent that the game feeder apparatus 110 has many structural features in common with the prior art game feeder 50 of FIG. 1. However, the game feeder apparatus 110 hereof is different from the prior art game feeder 50 in an important way.

Figure 2:
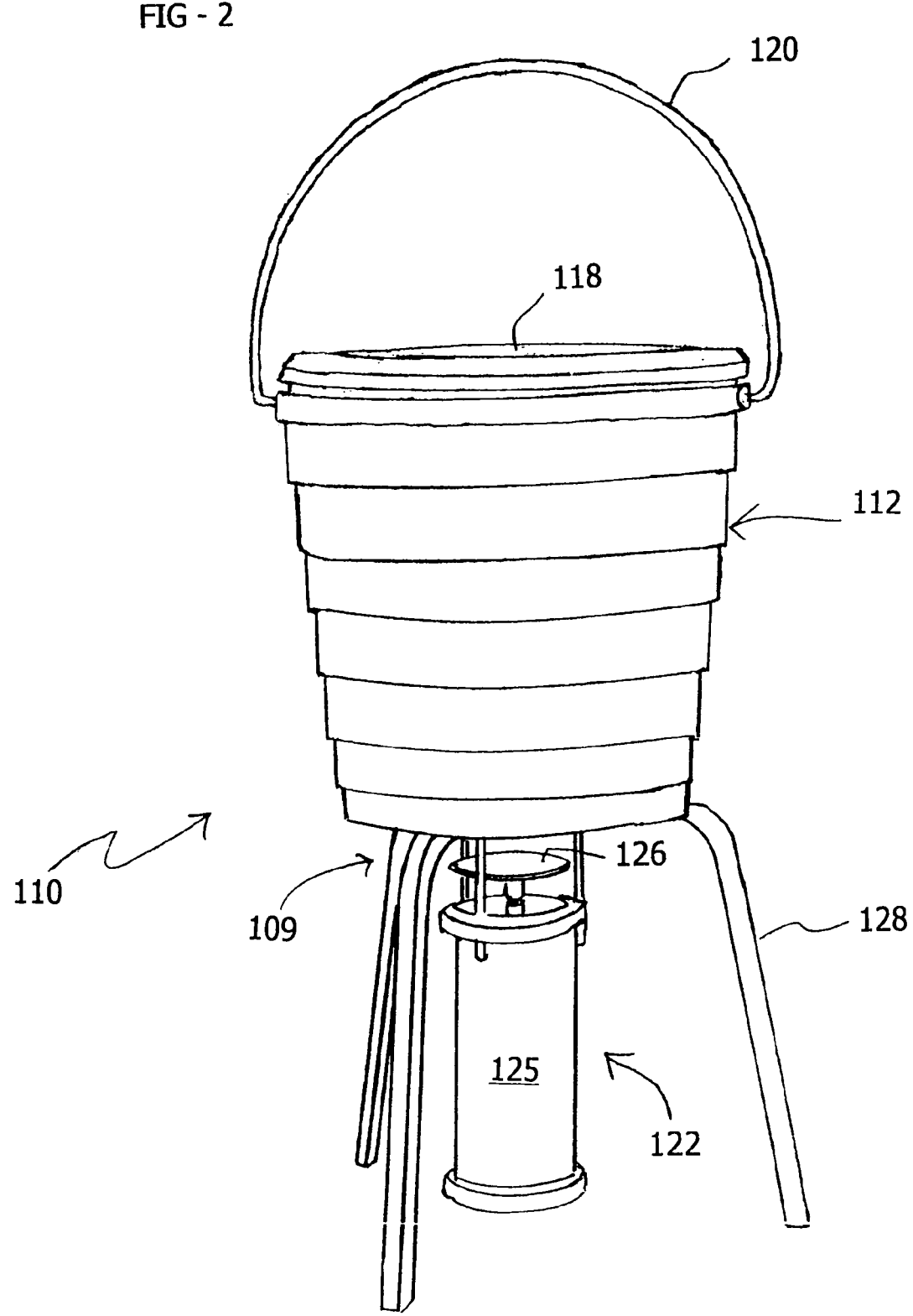
FIG. 2 is a perspective view of a wild game feeder according to a first illustrative embodiment of the present invention.
Figure 3A:
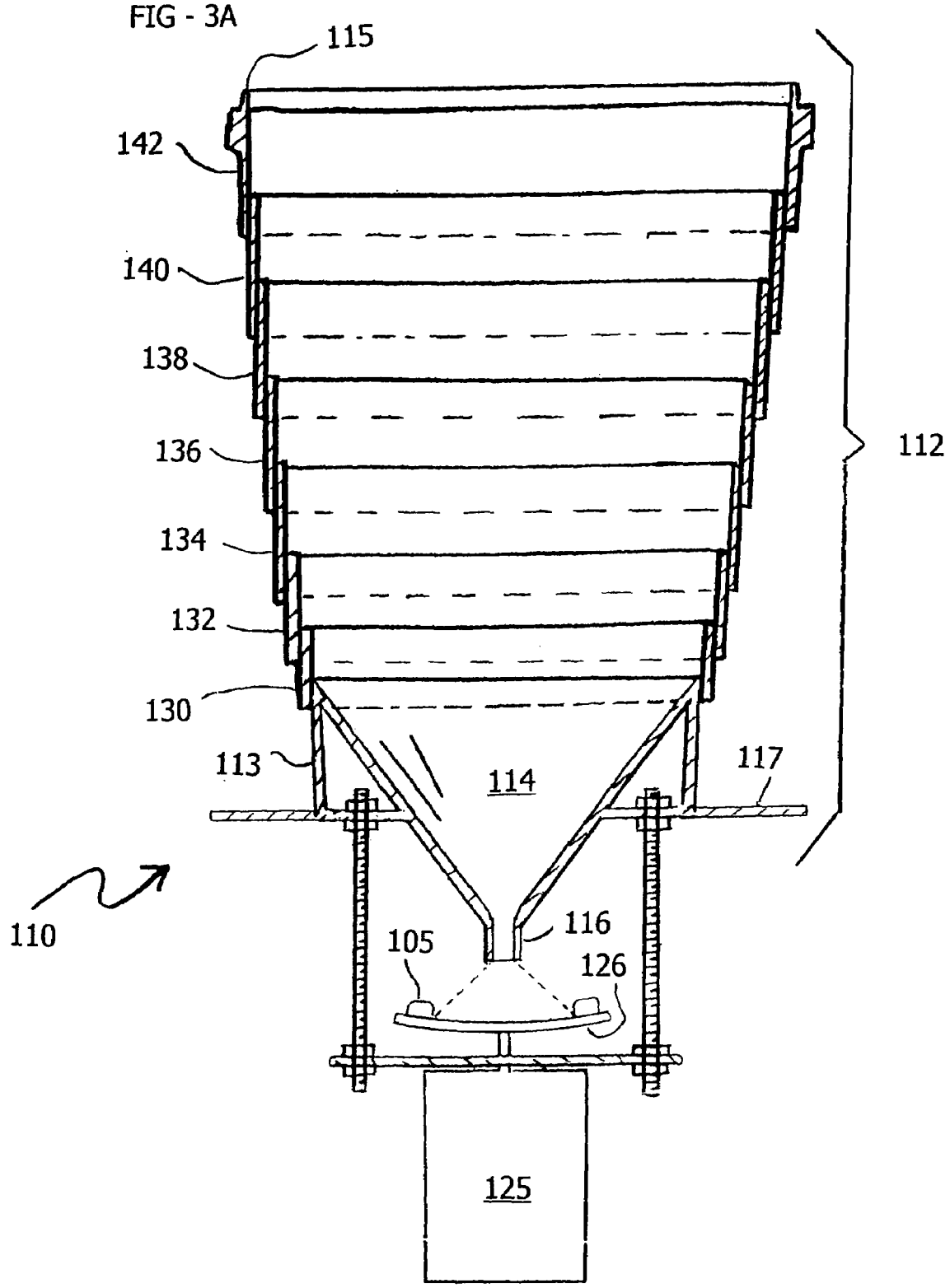
FIG. 3A is a first cross-sectional view of the apparatus of FIG. 2, showing the reservoir in its expanded, upright and operational configuration.
Figure 3B:
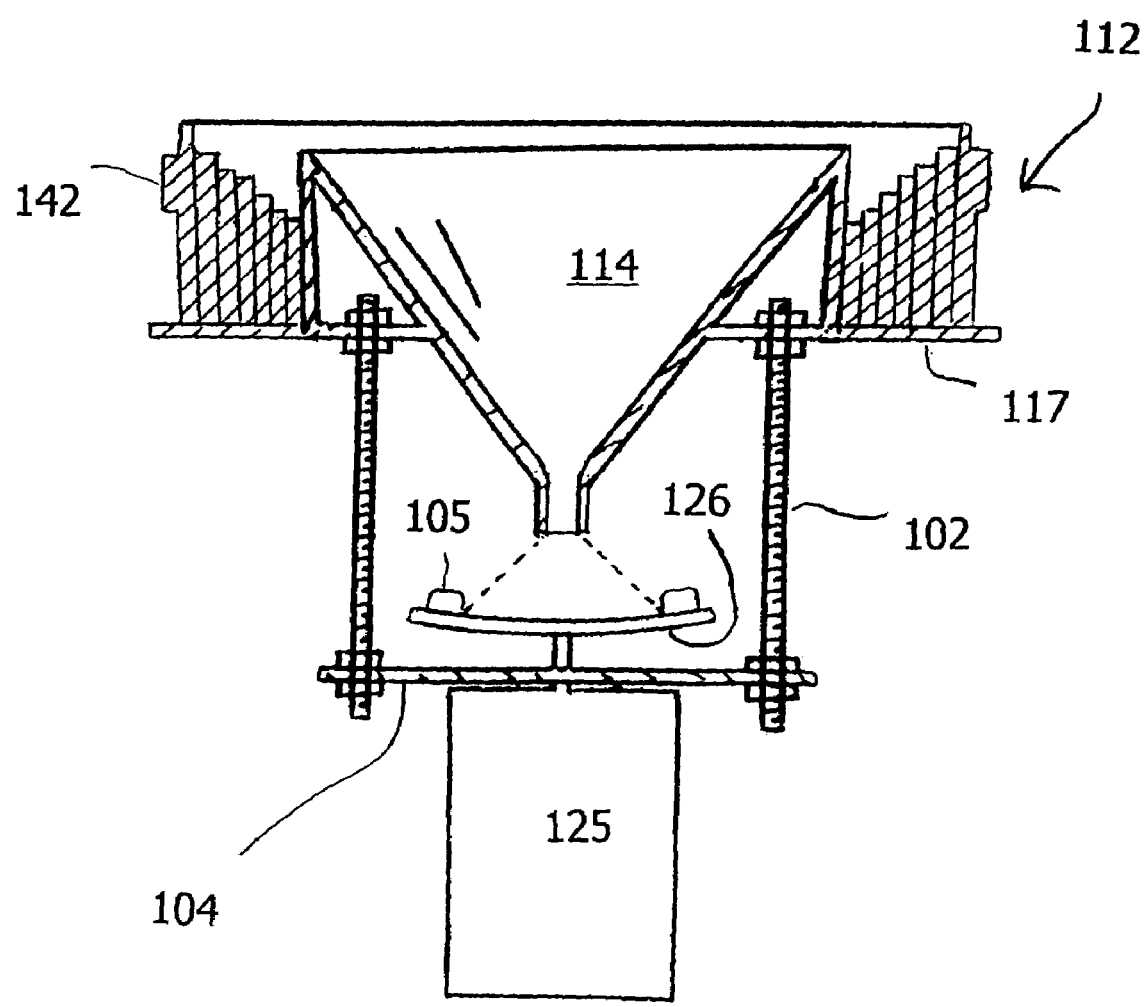
FIG. 3B is a second cross-sectional view of the apparatus of FIG. 2, showing the reservoir in its collapsed storage configuration.

The apparatus 110 according to the invention includes a collapsible reservoir 112, while the prior art game feeder 50 does not. Unlike the prior art game feeder, the game feeder according to the present invention can be placed in an expanded configuration for use, as shown in FIGS. 2 and 3A, and can also be compressed into a compact, collapsed configuration for storage and transport, as shown in FIG. 3B.

As used herein, the term "collapsible" means capable of being placed into a collapsed configuration which is smaller than an expanded operational configuration. The reservoir hereof may be collapsible because it is capable of being compressed into a smaller configuration without disassembly, as in the embodiments of FIGS. 2, 4, and 6 herein. Alternatively, the reservoir may be characterized as collapsible because it includes multiple component parts which are capable of being separated, disassembled and stacked or reassembled in a collapsed configuration, as in the embodiments of FIGS. 7 and 9.

The inclusion of the collapsible reservoir 112 in the game feeder 110 according to the invention provides significant commercial advantages. The game feeder 110 can be stored and transported in a significantly smaller package than, and takes up less space on the store shelf than the prior art feeder 50. Accordingly, the game feeder 110 hereof can be more densely packed in a given space, when stored in its compact configuration, whether that space is in a warehouse, in a truck trailer, in a stockroom, or on a store shelf.

First Embodiment

Overview

Figure 3C:
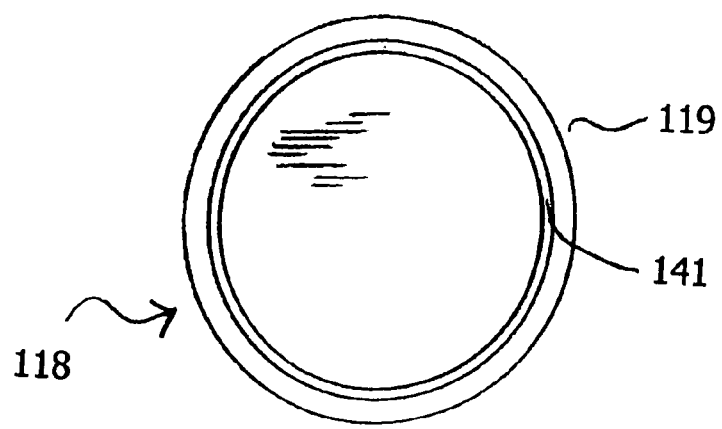
FIG. 3C is a detail bottom plan view of a lid, which is a component part of the apparatus of FIG. 2.
Figure 3D:
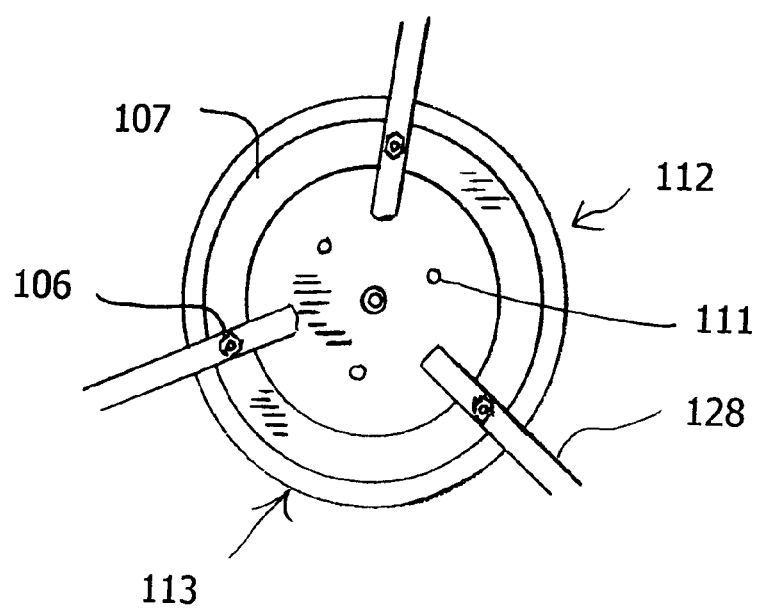
FIG. 3D is a detail bottom plan view of a reservoir base, which is another component part of the apparatus of FIG. 2.
Figure 4:
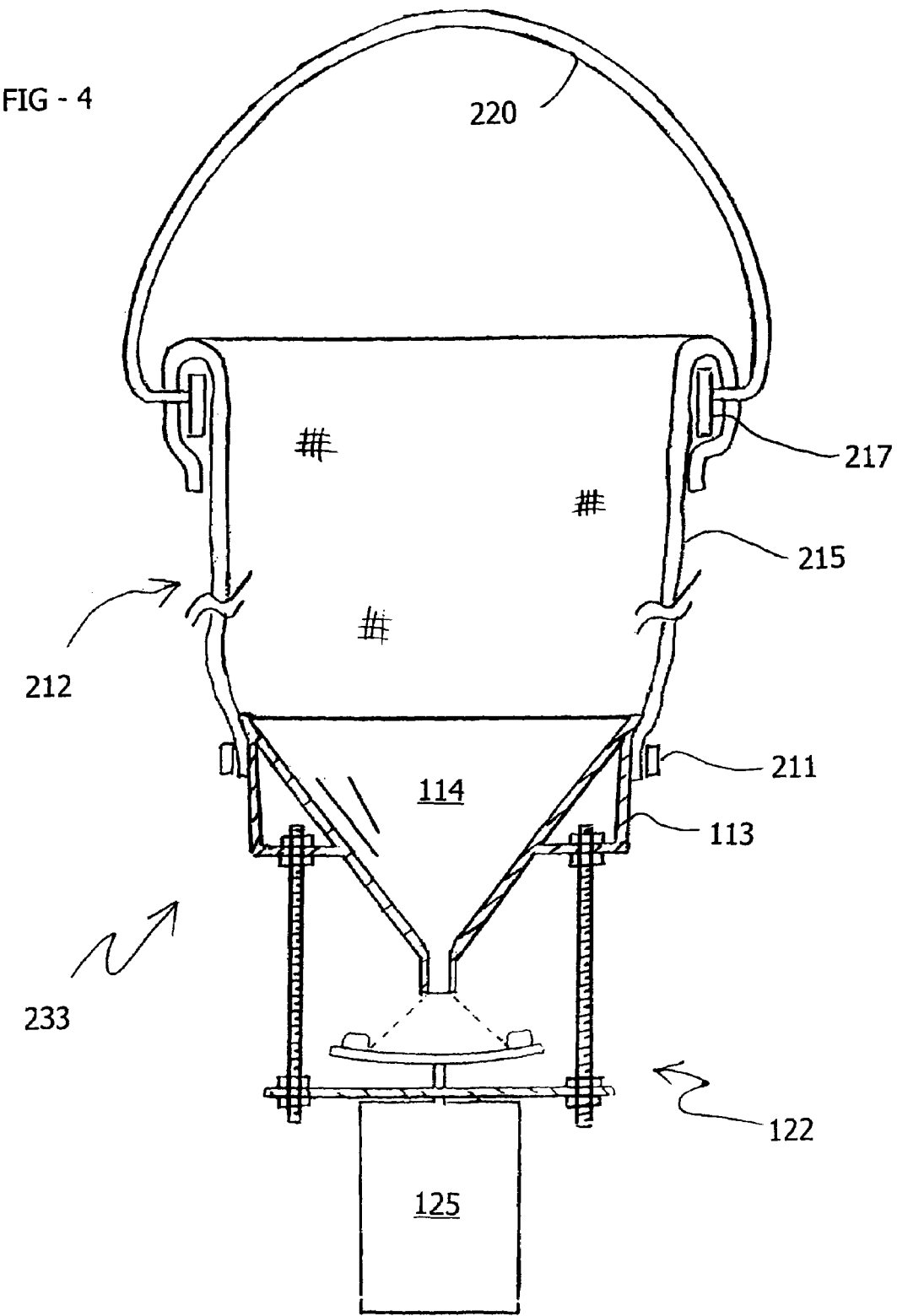
FIG. 4 is a cross-sectional view of a wild game feeder according to a second illustrative embodiment of the present invention.

Referring now to FIGS. 2–4, the feeder apparatus 110 according to the first illustrative embodiment of the invention includes a reservoir 112 in the form of a collapsible bucket, with an integral funnel member 114 including a spout 116 having a hole formed in the base thereof. The funnel member 114 is provided to direct the flow of particulate food such as corn, commercial pellets or the like, and to pass such food outwardly through the spout 116.

The collapsible reservoir 112 is provided with a removable lid 118 and a handle 120, as shown in FIG. 2. A distributor 122 including an electric motor 125 is attached to the base portion of the reservoir 110, to distribute the food after it passes outwardly from the funnel member 114. Supports such as legs 128 are also attached to the reservoir 112, to space it upwardly away from the ground.

The Collapsible Reservoir

The collapsible reservoir 112 is used to store and to meter out particulate food for wild game animals. The reservoir 112 includes a plurality of concentrically aligned annular plastic sections such as those shown at 130, 132, 134, 136, 138, 140 and 142. Each of the sequentially successive annular sections 130, 132, 134, 136, 138, 140 and 142 is made from a durable, relatively rigid plastic material, and is tapered outwardly as it moves from the lower end to the upper end thereof. In addition, each of the sections 130, 132, 134, 136, 138, 140 and 142 is slightly larger in diameter than the section below it.

The respective upper and lower edges of adjacent sections, such as those shown at 130 and 132, are adapted to frictionally engage one another in the expanded configuration of the reservoir 112, shown in FIG. 3A. In this way, the reservoir is able to support its own weight, and to remain in the expanded configuration shown in FIGS. 2 and 3A, until such time as a user wishes to manually collapse it.

The collapsible reservoir includes a substantially cylindrical base 113, which is integrally formed with the funnel member 114. Optionally, the base 113 may have an external horizontal flange 117 extending outwardly thereon, to support the annular sections 130, 132, 134, 136, 138, 140 and 142 when the reservoir 112 is in its collapsed configuration.

Referring to FIGS. 2 and 3C, the method of attachment of the lid 118 to the collapsible reservoir 112 is through the use of a groove 141, formed in the lower surface of the lid, that travels circumferentially along the outer periphery thereof, near the outer edge 119. The groove 141 permits the lid 118 to be attached to an upwardly extending lip 115, formed on top of the uppermost section 142 of the reservoir 112.

The Support Structure

The collapsible reservoir 112 is supported by a support structure 109. In the embodiment of FIGS. 2–3, the support structure 109 includes a plurality of legs 128 attached to the base portion 113 of the reservoir 112, with attachment points 106 for the legs located at the bottom of the collapsible reservoir 112. Optionally, the support structure may include a flat, circular reinforcing ring 107, preferably made of metal, attached to the reservoir 112 at the bottom of the reservoir base 113.

The collapsible reservoir 112 has holes 111 formed in the base 113 at the bottom thereof for receiving appropriate hardware, such as bolts or threaded studs 102 therethrough, to support the distributor 122, which includes the motor 125 and a rotating plate 126 connected to the shaft of the motor, the plate including two integral perpendicular actuators 105. The motor 125 is attached the collapsible reservoir 112 by three vertical studs 102 extending from the reservoir base 113, and attached to a mounting plate 104 which, in turn, is attached to the motor housing using welding, screws (not shown) or other conventional fasteners.

The Distributor

The distributor 122 is operated by the motor 125. Particulate food is placed into the collapsible reservoir 112, and passes through the reduced opening provided by the spout 116 at the bottom of the reservoir. The food comes to rest onto the rotation plate 126, and accumulates in a conical pile thereon, shown in phantom in FIG. 3A. Once the food accumulates to a certain height, it blocks the outlet and effectively stops the flow of any more food passing through the spout 116. Once the motor 125 is activated, the plate 126 spins, and food is distributed therefrom in a circular pattern within a certain radius of the feeder apparatus 110.

Optionally, the feeder apparatus 110 may include a control mechanism (not shown) including a timer, to actuate operation thereof at specific time intervals which are pre-set by a user.

Second Embodiment

Referring now to FIG. 4, a compressibly collapsible wild game feeder, according to a second embodiment of the invention, is shown generally at 233.

The collapsible game feeder 233 of FIG. 4 has many features in common with the game feeder 110 of the first embodiment, as previously described. For example, the game feeder 233 includes a funnel member 114, reservoir base 113, and distributor 122 which are substantially identical to those components as described herein in connection with the first embodiment.

All features of the game feeder 233, which are not specifically described herein as being different from the game feeder 110 of the first embodiment, will be understood as being substantially similar or identical to the game feeder of first embodiment, as previously described herein.

In the embodiment of FIG. 4, the wild game feeder 233 has a collapsible reservoir 212 which is used to store particulate food for wild game animals. In this second embodiment, the reservoir 212 includes a bag member 215 made of a flexible material, which may be cloth fabric, plastic, or wire mesh. The bottom end of the bag member 215 is attached to the reservoir base 113 around the circumference thereof by suitable hardware such as a circular clamping band 211.

A metal or strong plastic reinforcing hoop 217 is provided at the top of the bag member 215 to give structure and definition thereto. The bag member 215 is attached to the reinforcing hoop 217 in any appropriate fashion, such as by wrapping the material of the bag member around the reinforcing hoop, as shown, and then fastening the bag member to itself. In this embodiment, a wire handle 220 is provided, attached to the reinforcing hoop 217, to allow the entire apparatus 233 to be suspended from an elevated substrate such as a tree branch.

Third Embodiment

Figure 5:
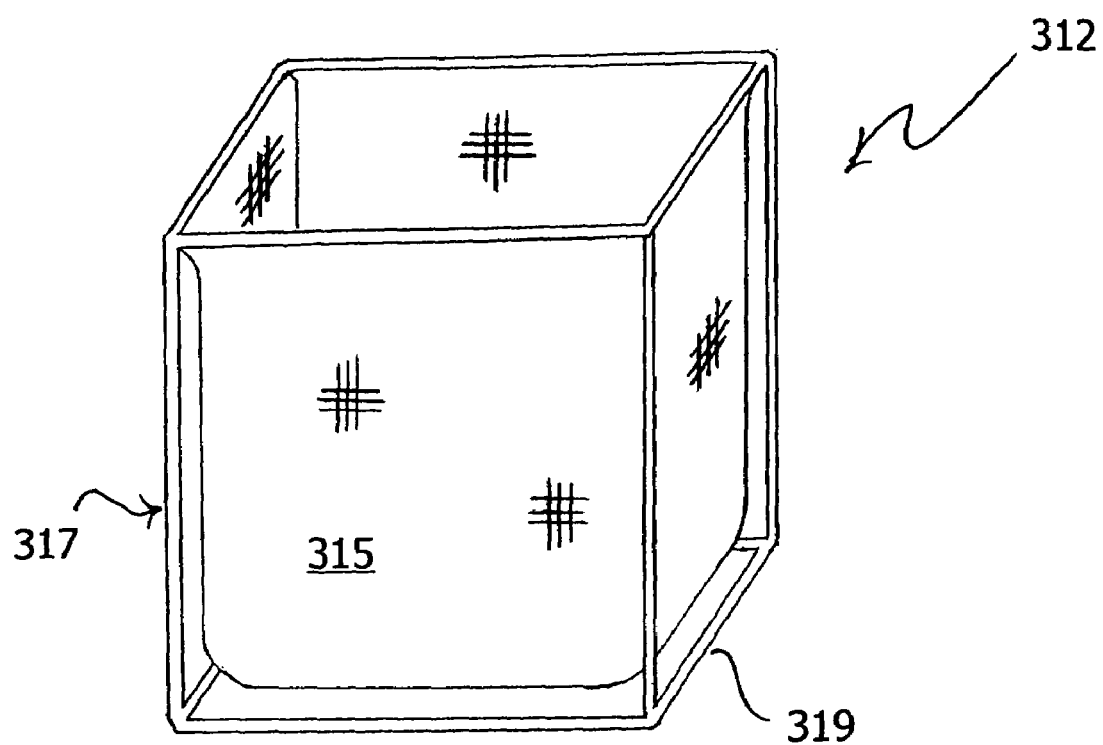
FIG. 5 is a perspective view of a reservoir and support structure therefor, which are components of a wild game feeder according to a third illustrative embodiment of the present invention.

Referring now to FIG. 5, an alternative version of a collapsible reservoir is shown at 312. It will be understood that the reservoir shown in FIG. 5 can be substituted for the reservoir 212 in the second embodiment shown in FIG. 4, to create a modified version of the second embodiment.

In the embodiment of FIG. 5, the reservoir 312 includes a bag member 315 made of a flexible material, which may be woven or nonwoven fabric material, strong flexible plastic sheeting, or wire mesh. The bottom end of the bag member 315 is attached to the reservoir base 113, around the circumference thereof, by suitable hardware such as the circular clamping band 211 shown in FIG. 4.

A collapsible cage 317, made of a plurality of hingedly interconnected bars 319, is provided for substantially surrounding the bag member 315, to give structure and definition thereto. The bag member 315 is attached to the cage 317 in any appropriate fashion, such as by wrapping the material of the bag member around the upper bars of the cage, and then fastening the bag member to itself. In this embodiment, the cage 317 can be connected in conventional fashion to other support structure, such as legs or a handle.

Fourth Embodiment

Figure 6:
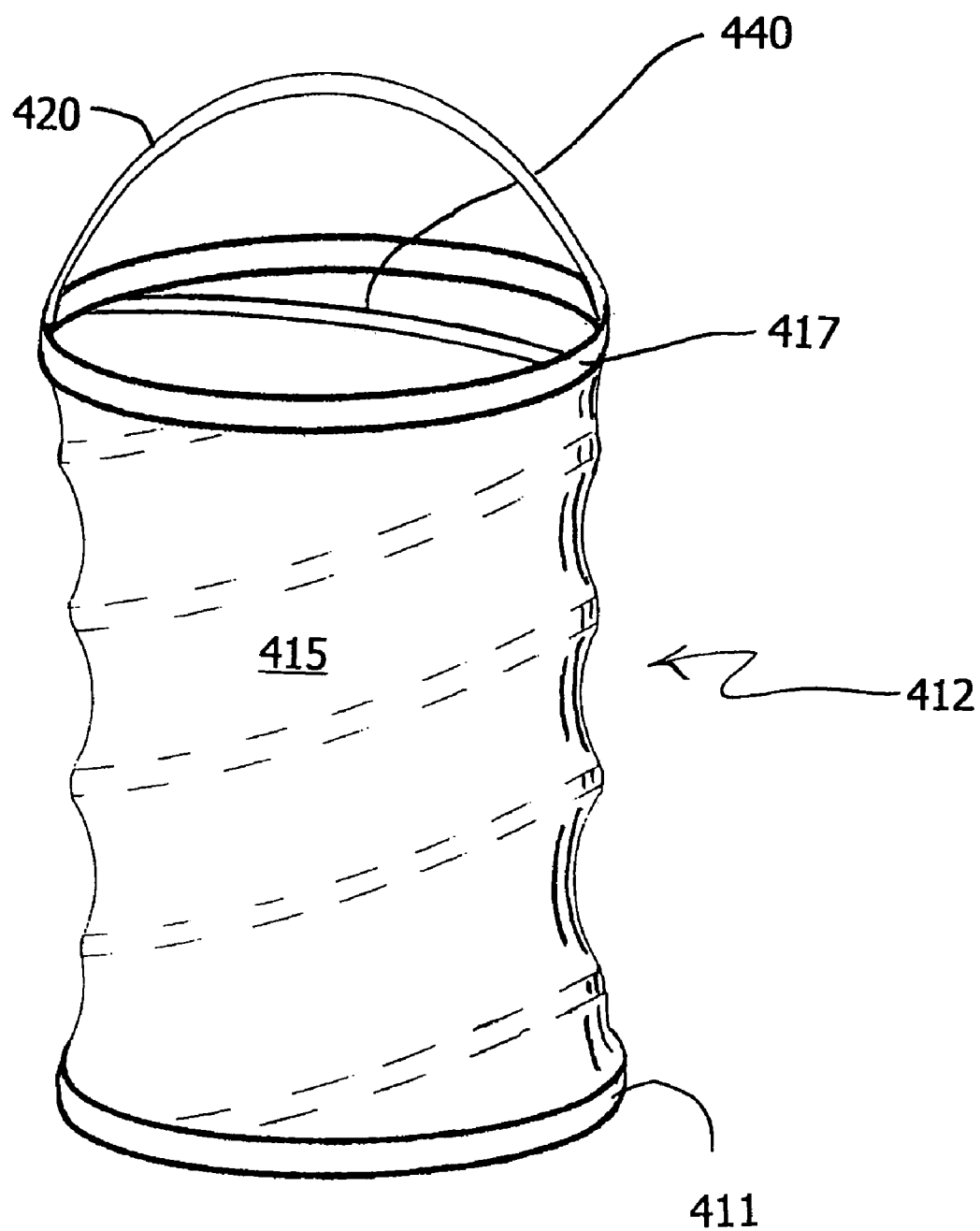
FIG. 6 is a perspective view of a reservoir for a wild game feeder according to a fourth embodiment of the present invention.

Referring now to FIG. 6, a collapsible reservoir in connection with a fourth embodiment of the invention is shown generally at 412. It will be understood that the reservoir shown in FIG. 6 can be substituted for the reservoir 212 in the second embodiment shown in FIG. 4, to create a modified version of the game feeder apparatus according to the second embodiment.

In the embodiment of FIG. 6, the reservoir 412 includes a bag member 415 made of a flexible material, which may be woven or nonwoven fabric material, strong flexible plastic sheeting, or wire mesh. The bottom end of the bag member 415 is attached to the reservoir base 113, around the circumference thereof, by suitable hardware such as a circular clamping band 411.

Also in the embodiment of FIG. 6, the reservoir 412 includes a coil spring 440 disposed on the interior of the bag member 415.

A metal or strong plastic reinforcing hoop 417 is provided at the top of the bag member 415 to work together with the spring 440, to give structure and definition to the reservoir 412. The bag member 415 is attached to the reinforcing hoop 417 in any appropriate fashion, such as for example, by wrapping the material of the bag member around the reinforcing hoop and then fastening the bag member to itself. In this embodiment, a wire handle 420 is provided, attached to the reinforcing hoop 217, to allow the entire apparatus 233 to be suspended from an elevated substrate, such as a tree branch.

Alternatively, in this embodiment, the reservoir 412 can be connected in conventional fashion to other support structure, such as the legs 128 used in the first embodiment. Vertical support for the reservoir 412 is provided by upward pressure of the spring 440, and in order to remain in the collapsed configuration thereof, appropriate clamps (not shown) must be placed on the collapsed bag member 415 to keep the spring compressed. In the field, when the apparatus is ready to be used, the clamps are removed, and the reservoir automatically assumes its expanded configuration.

In the embodiment of FIG. 6, the reservoir 412 may be collapsibly compressed by pressing the opposite ends of the bag member 415 inwardly against the force of the spring 440, and collapsing the spring and bag member into a small, collapsed configuration. It will be understood that in order to keep the reservoir 412 in such a collapsed configuration, appropriate clamping members of a known type should be placed surrounding the collapsed spring 440.

Fifth Embodiment

Referring now to FIG. 7, a collapsible reservoir in connection with a fifth embodiment of the invention is shown generally at 512, along with a funnel member 514 having a square outline shape as seen from the top. It will be understood that the reservoir and funnel member shown in FIG. 6 can be substituted for the reservoir 212 and funnel member 214 in the first embodiment shown in FIGS. 2–3, to create a modified version of the game feeder apparatus according to the first embodiment.

In the embodiment of FIG. 7, the reservoir 512 is made from a plurality of separate flat panel members 502, 504, 506, 508 which can be stored and shipped flat, but which can be interlockingly assembled in the field to form the rectangular box-shaped reservoir. The funnel member 514 is made in a size to fit inside of the reservoir, and is attached thereto by conventional fasteners. The remainder of the structure of the game feeder for the embodiment of FIG. 7, including the support structure and the distributor is similar or identical to that shown and discussed herein in connection with the first embodiment 110.

Sixth Embodiment

Figure 8:
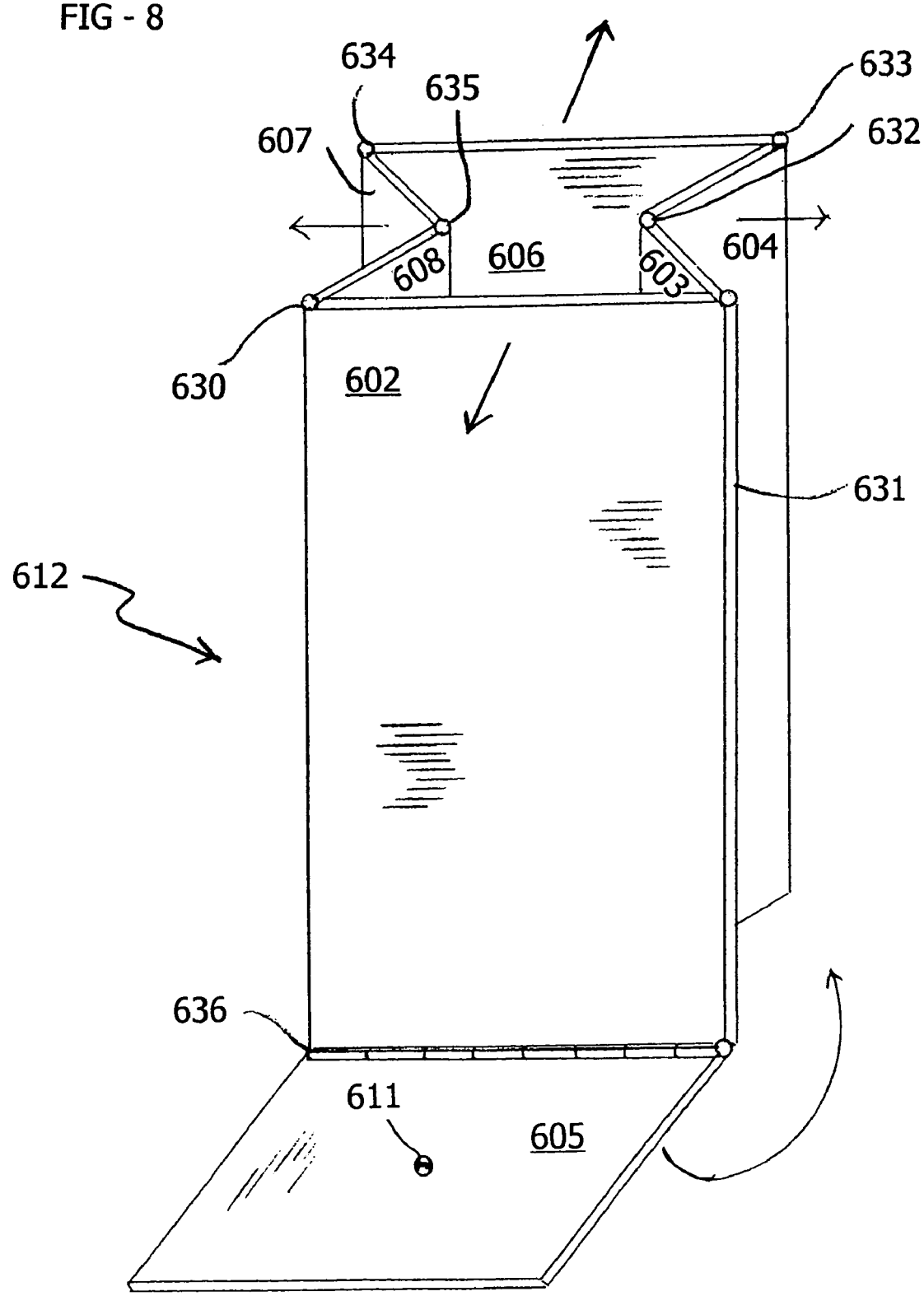
FIG. 8 is a perspective view of a collapsible reservoir usable as a component of a sixth embodiment of the present invention.

Referring now to FIG. 8, a collapsible reservoir in connection with a sixth embodiment of the invention is shown generally at 612. It will be understood that the reservoir 612 of FIG. 8 can be used with or without a funnel member. If a funnel member is desired, the funnel member 514 of FIG. 7 can be used together with the reservoir of FIG. 8.

It will be understood that the reservoir 612 shown in FIG. 8 can be substituted for the reservoir 212 and funnel member 214 in the first embodiment shown in FIGS. 2–3, to create a modified version of the game feeder apparatus according to the first embodiment.

In the embodiment of FIG. 8, the reservoir 612 is made from a plurality of separate flat panel members 602, 603, 604, 605, 606, 607 and 608, which are hingedly connected together by hinges 630–636 in the manner illustrated. The reservoir 612 may be made of a semi-rigid plastic material. The hinges 630–636, in the embodiment of FIG. 8, may be living hinges.

The reservoir 612 can be stored and shipped in a flat, collapsed configuration, but which can be expanded in the field to form the rectangular box-shaped reservoir.

The funnel member 514, where used, is made in a size to fit inside of the reservoir 612, and is attached thereto by conventional fasteners. The base panel 605 is provided with a hole 611 formed centrally therein to distribute particulate food therefrom. The remainder of the structure of the game feeder for the embodiment of FIG. 8, including the support structure and the distributor, is similar or identical to that shown and discussed herein in connection with the first embodiment 110.

Seventh Embodiment

Figure 9:
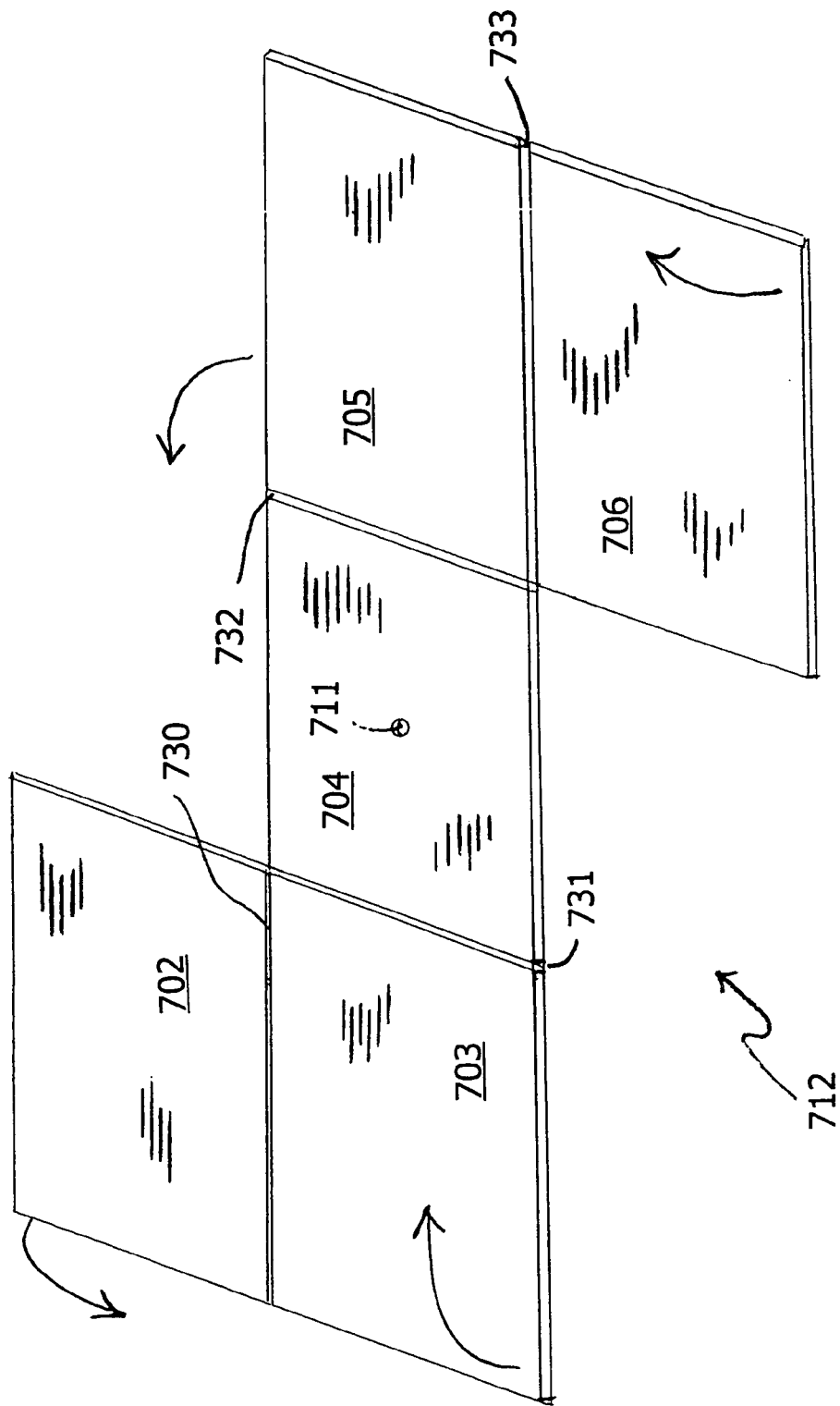
FIG. 9 is a perspective view of a foldable reservoir usable as a component of a seventh embodiment of the present invention, shown in a collapsed and fully unfolded configuration thereof.

Referring now to FIG. 9, a collapsible reservoir in connection with a seventh embodiment of the invention is shown generally at 712. It will be understood that the reservoir 712 of FIG. 8 can be used with or without a funnel member. If a funnel member is desired, the funnel member 514 of FIG. 7 can be used together with the reservoir of FIG. 9.

It will be understood that the reservoir 712 shown in FIG. 9 can be substituted for the reservoir 212 and funnel member 214 in the first embodiment shown in FIGS. 2–3, to create a modified version of the game feeder apparatus according to the first embodiment.

In the embodiment of FIG. 9, the reservoir 712 is made from a plurality of separate flat panel members 702, 703, 704, 705, and 706, which are hingedly connected together by hinges 730–733 in the manner illustrated. The reservoir 712 may be made of a semi-rigid plastic material. The hinges 730–733, in the embodiment of FIG. 8, may be living hinges. The base panel 704 is provided with a hole 711 formed centrally therein to distribute particulate food therefrom.

The reservoir 712 can be stored and shipped in a flat, collapsed configuration, but which can be expanded in the field to form the rectangular box-shaped reservoir. The abutting panel sides may be fastened together by clips, snap-fittings, or other conventional disconnectable fasteners.

The funnel member 514, where used, is made in a size to fit inside of the reservoir 712, and is attached thereto by conventional fasteners. The remainder of the structure of the game feeder for the embodiment of FIG. 8, including the support structure and the distributor, is similar or identical to that shown and discussed herein in connection with the first embodiment 110.

What is claimed is:

1. An apparatus for dispensing particulate food, comprising:
   a reservoir for holding a quantity of said food, said reservoir having a base with a hole formed therein:
      a support structure for supporting said reservoir in relation to a substrate;
      a distributor operatively attached to the bottom of said reservoir for distributing food from said reservoir into an area around said apparatus, said distributor comprising a motor and a rotatable plate operatively connected to said motor for rotation thereby;
      wherein said reservoir is collapsible into a compressed configuration for storage and transport, and is also expandable from said compressed configuration into an expanded configuration for use, said apparatus being larger with the reservoir in the expanded configuration than it is with the reservoir in the compressed configuration thereof;
      and wherein said reservoir comprises a bag formed from a flexible material, and a coil spring operatively attached to said bag.

2. The apparatus of claim 1, further comprising a timer.

3. An apparatus for dispensing particulate wild animal food, comprising:
- a reservoir for holding a quantity of said food, said reservoir hang a base with a hole formed therein, said reservoir comprising a hollow cylindrical body having a upper and lower end, where said cylindrical body comprises a sleeve formed from a flexible material, and a spring operatively attached to said hollow cylindrical body;
- a support structure for supporting said reservoir in relation to a substrate;
- a distributor for distributing food, which passes outwardly from said reservoir, into an area around said apparatus, said distributor comprising a motor and a rotatable plate connected to said motor;
- wherein said reservoir is compressably collapsible into a compressed configuration for storage and transport, and is also expandable from said compressed configuration into an expanded configuration for use, said expanded configuration being larger than said compressed configuration.

4. An apparatus for dispensing particulate wild animal food, comprising:
- a reservoir for holding a quantity of said food, said reservoir comprising a bag formed from a flexible material, and a coil spring operatively attached to said bag, said bag having a base with a hole formed therein;
- a support structure for supporting said reservoir in relation to a substrate;
- a distributor for distributing food, which passes outwardly from said reservoir, into an area around said apparatus, said distributor comprising a motor and a rotatable plate connected to said motor;
- wherein said reservoir is compressably collapsible into a compressed configuration for storage and transport, and is also expandable from said compressed configuration into an expanded configuration for use, said expanded configuration being larger than said compressed configuration.

* * * * *